Jan. 29, 1952  E. K. ANSCHUETZ  2,583,923
HYDRAULIC JACK
Filed April 8, 1948
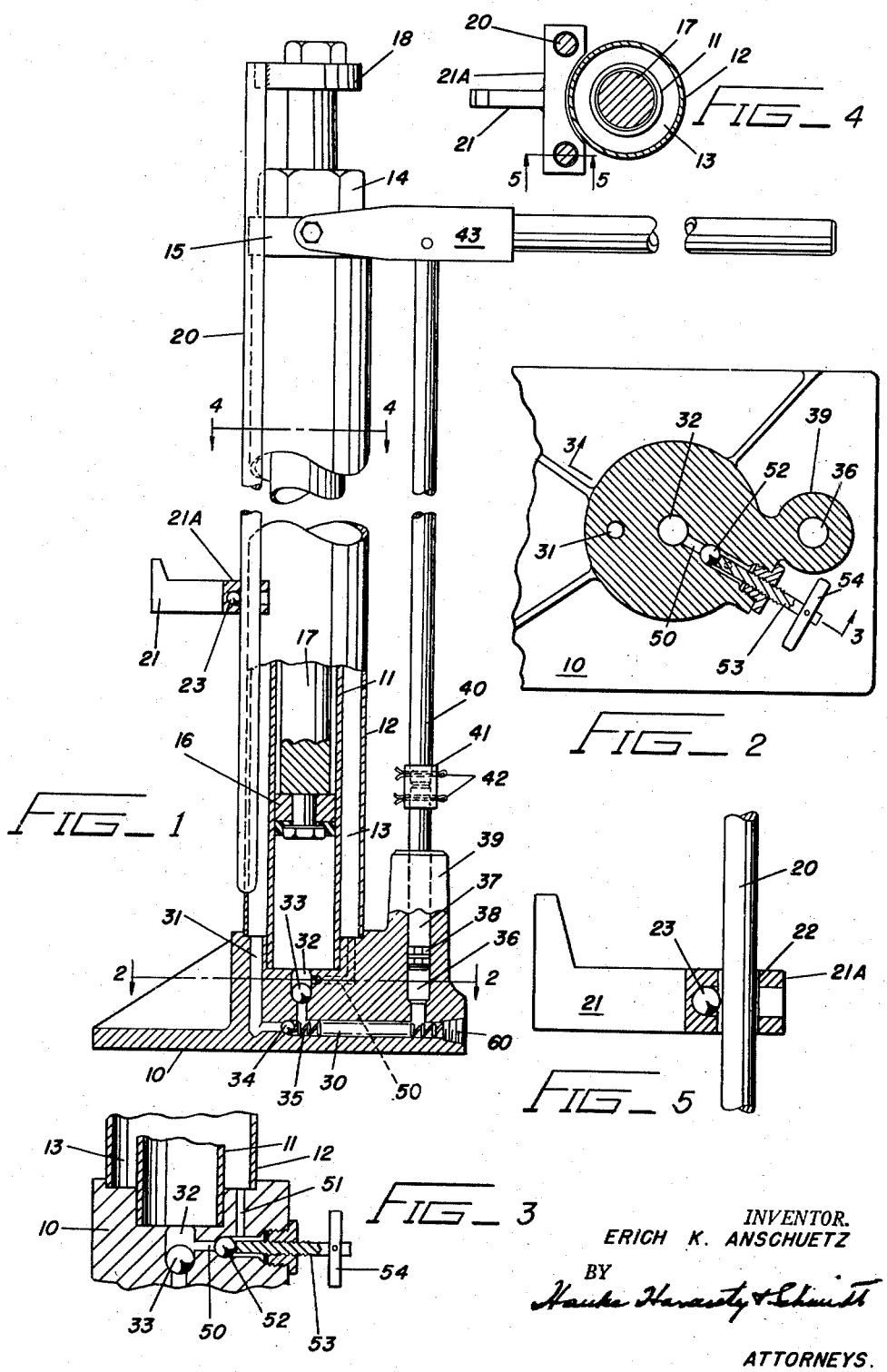
INVENTOR.
ERICH K. ANSCHUETZ
BY
ATTORNEYS.

Patented Jan. 29, 1952

2,583,923

UNITED STATES PATENT OFFICE 2,583,923

HYDRAULIC JACK

Erich K. Anschuetz, Grosse Pointe, Mich.

Application April 8, 1948, Serial No. 19,769

2 Claims. (Cl. 254—134)

The present invention relates to vehicle jacks of the hydraulic type and has among its objects the production of a jack of this type that is relatively simple in construction and operation as compared to known jacks of the same type.

Another object is to provide a jack that is less subject to leakage of the contained operating fluid—usually a suitable oil.

Another object is to provide a jack in which the load supporting stirrup may be easily and quickly adjusted to any one of a multiplicity of positions, utilizing a clutch and therefore not requiring previously prepared notches or definite locating means.

Another object is to greatly simplify the construction of the pump and oil retransfer means.

Still other objects and advantages will be apparent to those skilled in the art upon reference to the following description and the accompanying drawings in which Fig. 1 is a side elevation of the jack with parts being shown in vertical section.

Fig. 2 is a section on line 2—2 of Fig. 1.

Fig. 3 is a section on line 3—3 of Fig. 2.

Fig. 4 is a section on line 4—4 of Fig. 1.

Fig. 5 is an enlargement of a part of Fig. 1 and a section on line 5—5 of Fig. 4.

As shown in the drawing, the jack comprises a base 10 upon which are vertically mounted concentric tubes 11 and 12 of such different diameters as to provide a space 13 constituting an oil reservoir.

The inner tube 11 is threaded into the base and is sufficiently long to project from the top of tube 12 and is threaded to receive a nut 14, which is adapted to be screwed down upon a suitable cap 15 covering tube 12 and clamp the tubes and base together and provide fluid tight joints, suitable gaskets being used.

Slidably mounted in tube 11 is a piston 16 and piston rod 17, the latter being sufficiently long to project from the top of tube 11 when the piston 16 is adjacent the bottom, and to the top of rod 17 is fixed the member 18 forming part of the load carrying means.

The member 18 is preferably an eccentric disc and has welded to it the ends of a U-shaped element 20 consisting of an unhardened metal rod formed to a long narrow U with the sides parallel and of sufficient length to extend to adjacent the base 10 when the rod 17 is in its lowest position.

This element 20 carries a T-shaped stirrup member 21 the cross bar 21A of which is of substantial thickness vertically and which is provided with passages 22 loosely fitting the parallel bars of U member. In the outer side of each passage 22 and near the bottom is a hardened steel ball 23 so arranged that a portion of the ball projects into the passage.

This construction permits easily moving the unloaded member 21 vertically on the rods, but application of a load will tilt the stirrup and cause the balls 23 to superficially penetrate the rods and prevent downward movement.

As indicated, the outer tube 12 constitutes the fluid reservoir and the inner tube 11, the power cylinder into which the oil is forced to elevate rod 17 and the load carried thereby. The pump constituting the means for such forcing is part of the base 10.

In Figs. 1, 2 and 3 the base 10 is provided with a horizontal passage 30 bored from an outer face of the base member across the axial line of tube 11 to terminate below the space 13, and having branch passages 31 and 32 leading respectively to space 13 and the interior, at the bottom, of tube 11.

In branch passage 32 and opening upwardly is a ball valve 33 and in passage 30, between the branch passages, is a second ball valve 34 opening toward passage 32, being maintained in closed position by a spring 35. Also opening to passage 30 is a pump cylinder 36 in which is reciprocably mounted a piston 37 provided with suitable packing 38.

This piston 37 extends a short distance from the piston boss 39 and is connected to an extension 40 by means of a loose sleeve 41 and pins 42. The extension 40 at its upper end is pivotally connected to an operating handle 43 in turn pivotally connected to the cap 15 at the top of the tubes 11 and 12.

The arrangement of passages, valves and pump cylinder 30 to 39, constitutes a pump adapted to force oil drawn from space 13 into tube 11 to elevate the rod 17 and load and means is provided to retransfer the oil to space 13 to permit lowering of the rod.

Such means is shown in Figs. 1, 2 and 3, and comprises a passage 50 bored from the outer face of base 10 into the branch passage 32 above valve 33. A branch 51 connects this passage with the space 13 and a valve 52 is located between the branch 51 and the connection between passage 50 and passage 32. This valve opens toward the branch pasage 51 and is normally closed by means of a screw 53 extending to the outside of base 10 and operable by means of a suitable handle 54. The outer end of passage 30 is normally closed by means of a screw plug 60.

Now having described the invention and the preferred embodiment thereof, it is to be understood that said invention is to be limited not to the specific details herein set forth, but only by the scope of the claims which follow.

I claim:

1. A load support for vehicle jacks including an upwardly movable power actuated rod, said support consisting of a T-shaped stirrup member, the cross bar of which is provided with parallel vertical passages, each having a metallic ball set in the lower portion of its wall with a portion of the ball extending into the passage, and parallel bars loosely slidable in said passages, said bars being fixed at their upper ends to said rod.

2. A load support for jacks including an upwardly movable power actuated member, said load support comprising an unhardened steel rod depending from said member and a load engaging element carried by said rod, said load engaging element consisting of a horizontally arranged member provided with a vertical passage through which said rod loosely extends, a hardened steel element embedded in the wall of and projecting into said passage near the lower end thereof adjacent the surface of said rod but spaced therefrom a sufficient distance to permit free sliding of the unloaded element.

ERICH K. ANSCHUETZ.

REFERENCES CITED

The following references are of record in the file of this patent:

UNITED STATES PATENTS

| Number | Name | Date |
|---|---|---|
| 383,710 | Crecelius | May 29, 1888 |
| 799,188 | Reid | Sept. 12, 1905 |
| 1,880,732 | Bolens | Oct. 4, 1932 |
| 1,904,115 | Bacon | Apr. 18, 1933 |
| 2,107,717 | Smith | Feb. 8, 1938 |
| 2,165,367 | Gormley et al. | July 11, 1939 |

FOREIGN PATENTS

| Number | Country | Date |
|---|---|---|
| 49,524 | Sweden | June 29, 1921 |